(12) United States Patent
Straehle

(10) Patent No.: US 7,142,310 B2
(45) Date of Patent: Nov. 28, 2006

(54) INTERFEROMETRIC MEASURING DEVICE UTILIZING AN ACTIVE OPTICAL ELEMENT

(75) Inventor: Jochen Straehle, Dettenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 10/762,889

(22) Filed: Jan. 21, 2004

(65) Prior Publication Data
US 2004/0179203 A1    Sep. 16, 2004

(30) Foreign Application Priority Data
Jan. 21, 2003    (DE) ................ 103 02 055

(51) Int. Cl.
*G01B 11/02* (2006.01)
(52) U.S. Cl. .................................... 356/497
(58) Field of Classification Search ............. 356/497, 356/503, 511, 479
See application file for complete search history.

(56) References Cited

U.S. PATENT DOCUMENTS

| | | | |
|---|---|---|---|
| 3,849,003 A | 11/1974 | Velzel | |
| 4,652,131 A | 3/1987 | Fercher et al. | |
| 6,134,003 A * | 10/2000 | Tearney et al. | 356/479 |
| 6,381,015 B1 * | 4/2002 | Sonehara et al. | 356/497 |

FOREIGN PATENT DOCUMENTS

| | | |
|---|---|---|
| DE | 41 37 562 | 1/1993 |
| DE | 43 36 318 | 4/1995 |
| DE | 100 47 495 | 10/2001 |
| DE | 101 31 779 | 2/2002 |
| DE | 100 39 239 | 3/2002 |
| DE | 101 31 780 | 3/2002 |
| EP | 12 64 75 | 11/1984 |
| EP | 0 126 475 | 3/1989 |

OTHER PUBLICATIONS

P. Ney, A. Maillard and M.D. Fontana, J. Opt. Soc. Am. B/vol. 7, No. 7/Jul. 2000, pp. 1158-1165.

* cited by examiner

*Primary Examiner*—Hwa (Andrew) Lee
*Assistant Examiner*—Marissa J Detschel
(74) *Attorney, Agent, or Firm*—Kenyon & Kenyon LLP

(57) ABSTRACT

An interferometric measuring device for measuring the surface of an object by depth scanning, having a short-coherent light source, the emitted light of which is guided to a beam splitter for producing an object beam which is directed via an object beam path to the object and a reference beam which is directed via a reference beam path to a reference surface, having an image recorder for recording the light reflected by the object surface and by the reference surface and combined for interference, and having an evaluation device for determining the surface shape. A white light interferometer without mechanical actuating mechanisms for depth scanning is obtained by placing at least one active optical element that may be influenced by an electrical and/or magnetic field in the object beam path and/or the reference beam path, it being possible to use it to change the optical length of the object light path in relation to the optical length of the reference light path for the depth scanning.

15 Claims, 1 Drawing Sheet

INTERFEROMETRIC MEASURING DEVICE UTILIZING AN ACTIVE OPTICAL ELEMENT

FIELD OF THE INVENTION

The present invention relates to an interferometric measuring device for measuring the surface of an object by depth scanning, having a short-coherent light source, the emitted light of which is guided to a beam splitter for producing an object beam which is directed via an object beam path to the object and a reference beam which is directed via a reference beam path to a reference surface, having an image recorder for recording the light reflected back by the object surface and by the reference surface and combined for interference, and having an evaluation device for determining the surface shape.

BACKGROUND INFORMATION

Interferometric measuring devices of this type, usually described as white light interferometers, are known in various embodiments, for which reference may be made, for example, to German Patent Application Nos. DE 100 47 495, DE 101 31 780, DE 100 39 239 and DE 101 31 779, including the additional publications cited in these documents. All of these interferometric measuring devices have in common that for the depth scanning of the surface the object light path is adjusted in relation to the reference light path by a unit moving the object, the optical scanning device, or the reference surface in the depth scanning direction (z-direction). It is known that interference phenomena occur only within the coherence length of the light emitted by the light source, which is, for example, in the range of a few micrometers. The shape of the surface is measured, for example, by determining the maximum interference using the evaluation device; however, other evaluation criteria are also conceivable. In order to obtain precise results, the actuating unit designed as an actuating mechanism or a piezoelectrically operated unit must, in particular, be precisely adjusted and made insensitive to external influences such as those occurring in a manufacturing process, in particular.

An object of the present invention is to provide an interferometric measuring device of the type defined above, which provides depth scanning which is as insensitive as possible.

SUMMARY OF THE INVENTION

This object is achieved with the features according to the present invention. It is accordingly provided that at least one active optical element that may be influenced by an electrical and/or magnetic field is placed in the object beam path and/or the reference beam path, it being possible to use it to change the optical length of the object light path in relation to the optical length of the reference light path for the depth scanning.

This design of the measuring device including the active optical element causes the depth scanning to be performed without mechanically moved parts, thus avoiding malfunctions relating thereto. The depth scanning of the object surface is solely brought about by activating the at least one optical element, the activation signal making it easy to select the suitable scanning mode and facilitating the analysis.

An advantageous embodiment includes using at least one electro-optical element as an active optical element. For example, an electrically actuatable crystal such as is known from P. Ney, A. Maillard and M. D. Fontana, J. Opt. Soc. Am. B/Vol. 7, No. 7/July 2000, pages 1158 through 1165, may be used for this purpose.

Another advantageous embodiment for improving the measured results includes placing at least one active optical element in the first beam path for changing the optical light path for the depth scanning and placing at least one other active optical element in the other beam path for a color error correction and/or an imaging error correction.

Specifically influencing the scanning wave front is made possible by applying a non-homogeneous electrical field to the at least one active optical element for deforming the relevant wavefront in a controlled manner, thus making it possible to specifically tune to properties of the surface during the scanning.

Another adaptation to the particular measuring task may be achieved by manufacturing the at least one active optical element to have a non-homogeneous optical density for influencing of the wavefront in a controlled manner. The non-homogeneous optical density may be achieved, for example, by suitable doping, similar to that which is known for GRIN lenses.

Furthermore, it is possible to specifically adapt the beam path during scanning in that the at least one optical element is a lens, lens system, part of a lens system or at least part of light-deflecting optical media.

DETAILED DESCRIPTION

Figure 1:
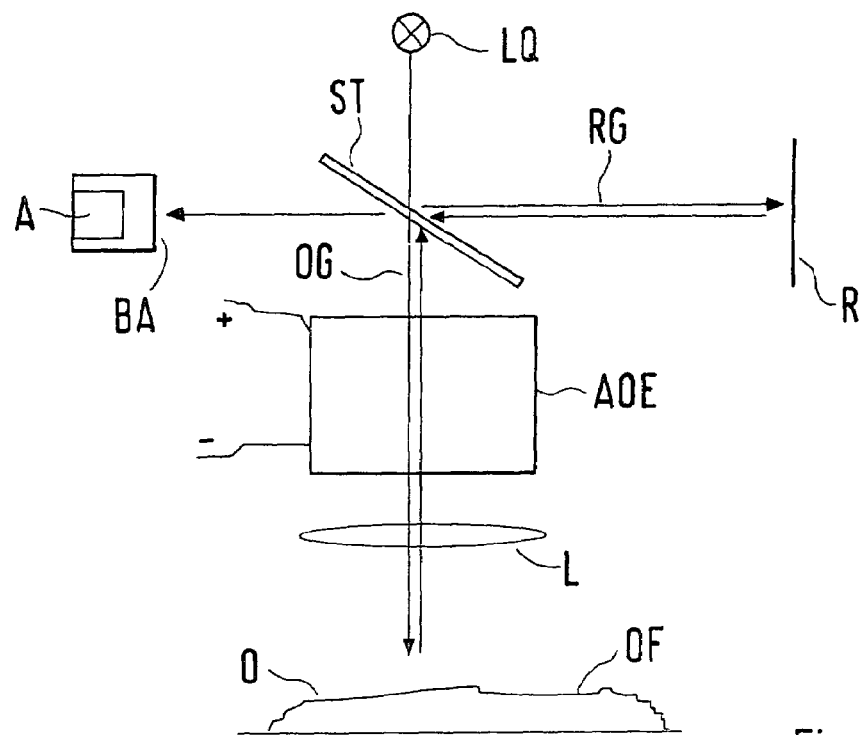
FIG. 1 shows a schematic view of an interferometric measuring device having an active optical element situated in an object beam path.

As shown in FIG. 1, the interferometric measuring device, which is designed in particular as a white light interferometer, has a light source LQ and a beam splitter ST for forming an object beam path OG leading to the surface OF of a measuring object O and a reference beam path RG leading to a reference surface R from the light emitted by light source LQ. The light beams reflected by object surface OF and reference surface R are superimposed and interfere at, for example, beam splitter ST or at another suitable location if the optical path lengths of object beam path OG and of reference beam path RG are within the coherence length of the light of light source LQ (or if necessary, of the spectrally adjusted light). The coherence length is, for example, in the range of several or several tens or hundreds of micrometers. The maximum interference contrast is achieved when object beam path OG and reference beam path RG have the same optical path length. The superimposed light is supplied to an image recorder BA, in particular a camera (CCD camera or CMOS camera), and analyzed in a connected evaluation device A with respect to the shape of scanned object surface OF. As a surface shape, it is possible to record, for example, a surface roughness and/or desired surface contours in order to obtain a three-dimensional measurement of the object surface. In order to adapt the beam path to object surface OF, a suitable lens system L is situated in object beam path OG, it being possible to combine it with additional optical elements as is explained in greater detail in the publications cited above. Optical elements of this type may also be situated in the reference beam path RG.

As FIG. 1 further shows, an active optical element AOE is situated in object beam path OG to produce the depth scanning (z-direction) of object surface OF, it being possible to specifically vary the optical wavelength of object beam path OG in relation to reference beam path RG using active optical element AOE. In the present case, this is, for example, an electro-optically active crystal, the refractive properties of which are suitably controlled using an electric voltage signal or the electrical field resulting therefrom, as is known from the article by P. Ney et al in J. Opt. Soc. Am., 2000, pages 1158 through 1165 cited above. Similar electro-optically active elements may also be used. In addition, electromagnetic or magnetically influenceable active optical elements may be considered. The activation signal may be easily formed for a suitable activation of active optical element AOE and also synchronized with the analysis in evaluation device A and with the activation of image recorder BA. Tuning to a lateral scan of object surface OF in the x and y direction may also be easily performed.

Figure 2:
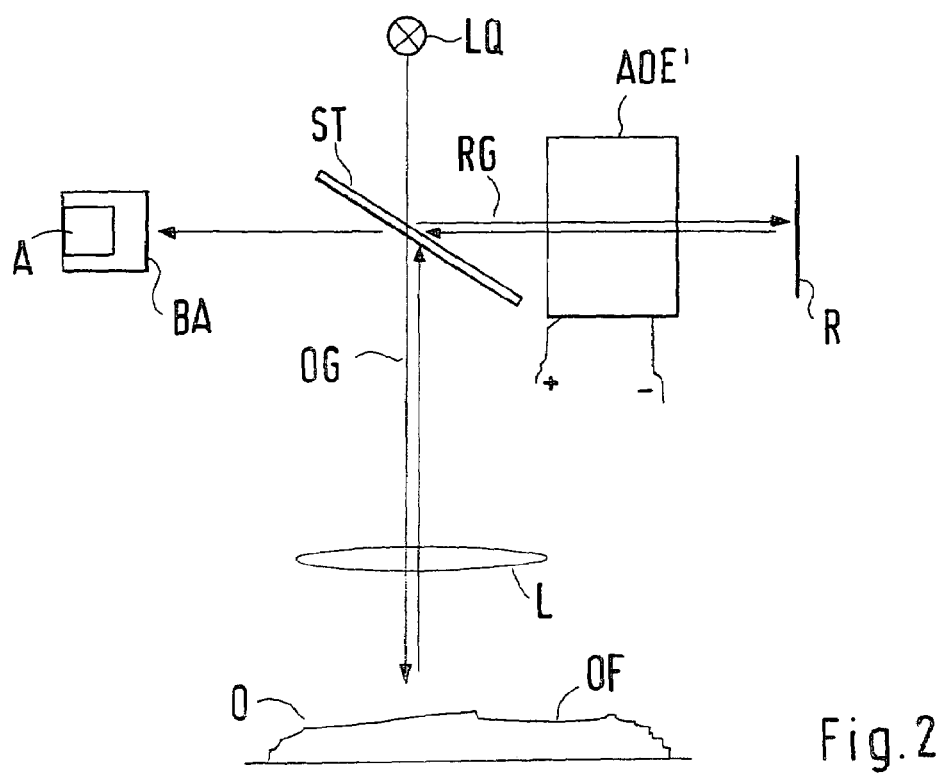
FIG. 2 shows a schematic view of another interferometric measuring device having active optical elements situated in the reference beam path.

FIG. 2 shows an alternative embodiment of the interferometric measuring device, an active optical element AOE' being positioned in reference beam path RG. Active optical element AOE' in reference beam path RG may be used to compensate for color errors or other imaging errors of active optical element AOE present in object beam path OG when used in combination with it, and/or it may also be used to change the optical wavelength of reference beam path RG in relation to the optical wavelength of object beam path OG.

Additional possible embodiments provide that lens system L is at least partially designed as an active optical element AOE. In addition, it is also possible to produce a combination with other, for example, deflecting optical elements in order to achieve a suitable adaptation to a particular object surface OF to be measured. Appropriate elements may also be positioned in reference beam path RG for compensation. It is also conceivable to design deflecting elements as active optical elements. The use of such combinations of a plurality of active optical elements AOE or AOE' in object beam path OG and/or reference beam path RG expands the possible applications of the interferometric measuring device for different measuring tasks.

If signals for generating a non-homogeneous field are applied to, for example, an electro-optically active optical element AOE, it is also possible to shape the wavefronts in a controlled manner and adapt them to the shape of object surface OF to be measured, e.g., curved surfaces, in order to be able to project them on a plane. The signals may be supplied, for example, using transparent electrodes on the beam transmission surfaces or by positioning active optical element AOE on surfaces located to their sides.

It is also possible to obtain a deformation of the wavefronts by designing active optical element AOE or AOE' as a crystal of non-homogeneous optical density similar to known GRIN lenses. These crystals in turn may also be activated by homogeneous or non-homogeneous fields. In this case, it is also possible to perform error correction in the manner described above.

If homogeneous electrical fields are used to activate the at least one optical element AOE, the wavefront is not influenced during the passage through the element, while it may be specifically controlled locally by applying a non-homogeneous field, thus making it possible to expand the applications of the interferometer. Combining a plurality of active optical elements AOE or AOE' which are activated by the same or different voltage signals expands the possible applications even further, because it is possible to deform the wavefronts more strongly or more specifically and it is also possible to expand the depth scanning range. For example, the properties of divergent and convergent lenses may be produced and combined in different ways.

The measures described make depth scanning of object surface OF possible without a mechanical movement using mechanical actuating mechanisms.

What is claimed is:

1. An interferometric measuring device for measuring a surface of an object by depth scanning, the device comprising:
    a short-coherent light source for emitting light;
    a beam splitter, the emitted light being guided to the beam splitter, the beam splitter producing an object beam which is directed via an object beam path to the object and a reference beam which is directed via a reference beam path to a reference surface;
    an image recorder for recording the light reflected back by the object surface and by the reference surface and combined for interference;
    an evaluation device for determining a surface shape; and
    at least one active optical element is influenced by at least one of an electrical field and a magnetic field, the optical element being situated in at least one of the object beam path and the reference beam path, the optical element for changing an optical length of an object light path in relation to an optical length of a reference light path for a depth scanning;
    wherein the at least one active optical element includes a first active optical element situated in one of the object beam path and the reference beam path for changing an optical light path for the depth scanning and a second active optical element situated in another of the object beam path and the reference beam path for at least one of a color error correction and an imaging error correction.

2. The device according to claim 1, wherein the at least one active optical element includes at least one electro-optical element.

3. The device according to claim 1, wherein a non-homogeneous electrical field is applied to the at least one active optical element for a controlled deformation of a relevant wavefront.

4. The device according to claim 1, wherein the at least one of the active optical elements has a non-homogeneous optical density for influencing a wavefront in a controlled manner.

5. The device according to claim 1, wherein the at least one optical element includes at least one of a lens, a lens system, a part of a lens system, and at least a part of light-diverting optical media.

6. The device according to claim 1, where in the interferometric measuring device includes a white-light interferometer, and at least one of the active optical elements and a control device for the at least one of the active optical elements are designed to carry out depth scanning, for the depth scanning, the optical length of the object light path is changeable relative to the optical length of the reference light path without mechanical moving parts.

7. The device according to claim 6, wherein the at least one of the first active optical element and second active optical element include at least one electro-optical element.

8. The device according to claim 6, wherein a non-homogeneous electrical field is applied to the at least one of the first active optical element and second active optical element for a controlled deformation of a relevant wavefront.

9. The device according to claim 6, wherein the at least one of the active optical elements includes a non-homogeneous optical density for influencing a wavefront in a controlled manner.

10. The device according to claim 6, wherein the at least one of the active optical elements includes at least one of a lens, a lens system, a part of a lens system, and at least a part of light-diverting optical media.

11. An interferometric measuring device for measuring a surface of an object by depth scanning, the device comprising:
- a short-coherent light source for emitting light;
- a beam splitter, the emitted light being guided to the beam splitter, the beam splitter producing an object beam which is directed via an object beam path to the object and a reference beam which is directed via a reference beam which is directed via a reference beam path to a reference surface;
- an image recorder for recording the light reflected back by the object surface and by the reference surface and combined for interference;
- an evaluation device for determining a surface shape; and
- at least one active optical element that is influenced by at least one of an electrical field and a magnetic field, the optical element being situated in at least one of the object beam path and the reference beam path, the optical element for changing an optical length of an object light path in relation to an optical length of a reference light path for a depth scanning, the interferometric measuring device arranged as a white-light interferometer, for the depth scanning, the optical length of the object light path is changeable relative to the optical length of the reference light path without mechanically moving parts;
- wherein the at least one active optical element includes an active optical element situated in another of the object beam path and the reference beam path for at least one of a color error correction and an imaging error correction.

12. The device according to claim 11, wherein the at least one active optical element includes at least one electro-optical element.

13. The device according to claim 11, wherein a non-homogeneous electrical field is applied to the at least one active optical element for a controlled deformation of a relevant wavefront.

14. The device according to claim 11, wherein the at least one active optical element has a non-homogeneous optical density for influencing a wavefront in a controlled manner.

15. The device according to claim 11, wherein the at least one optical element includes at least one of a lens, a lens system, a part of a lens system, and at least a part of light-diverting optical media.

* * * * *